United States Patent
Kim et al.

(10) Patent No.: US 7,418,246 B2
(45) Date of Patent: Aug. 26, 2008

(54) PHYSICAL LAYER UNIT FOR TRANSMITTING OR RECEIVING VARIOUS SIGNALS, WIRELESS LAN SYSTEM INCLUDING THE SAME, AND WIRELESS LAN METHOD USING THE WIRELESS LAN SYSTEM

(75) Inventors: Jae-woo Kim, Kyungki-do (KR); Hoon-soon Choi, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 679 days.

(21) Appl. No.: 10/753,005

(22) Filed: Jan. 7, 2004

(65) Prior Publication Data

US 2004/0165564 A1     Aug. 26, 2004

(30) Foreign Application Priority Data

Feb. 26, 2003   (KR) ................ 10-2003-0012045

(51) Int. Cl.
| | |
|---|---|
| H04B 1/18 | (2006.01) |
| H04M 1/00 | (2006.01) |
| H04K 1/10 | (2006.01) |
| G05B 23/02 | (2006.01) |
| H04Q 7/24 | (2006.01) |

(52) U.S. Cl. .............. 455/168.1; 455/552.1; 455/426.1; 375/260; 340/3.21; 370/338

(58) Field of Classification Search ................ 455/3.01, 455/102, 403, 42, 41.2, 168.1, 552.1, 553.1; 370/338, 335, 208, 204, 342, 395.5
See application file for complete search history.

(56) References Cited

U.S. PATENT DOCUMENTS

| | | | |
|---|---|---|---|
| 2003/0072284 A1* | 4/2003 | Webster et al. .............. 370/335 |
| 2004/0152418 A1* | 8/2004 | Sinha et al. ................... 455/42 |

* cited by examiner

Primary Examiner—Nick Corsaro
Assistant Examiner—Shannon R Brooks
(74) Attorney, Agent, or Firm—Frank Chau & Associates, LLC (57) ABSTRACT

A physical layer unit (PLU) for receiving (and transmitting) various signals, a wireless Local Area Network (LAN) system including the PLU, and a wireless LAN method using the wireless LAN system. The wireless LAN system is capable of receiving signals of different standards, by performing a first preamble processing of an input signal for a predetermined first time period of 16 μs (the preamble processing time period according to an OFDM standard for determining whether the input signal corresponds to the OFDM standard), and performing a second preamble processing within a predetermined second time period (the remainder of a preamble processing time period for determining whether the input signal corresponds to a DSSS/CCK standard), if the input signal does not correspond to the OFDM standard. Therefore, DSSS/CCK and OFDM signals can be transmitted and received reliably in the integrated wireless LAN system according to the IEEE 802.11.g standard.

31 Claims, 7 Drawing Sheets

PHYSICAL LAYER UNIT FOR TRANSMITTING OR RECEIVING VARIOUS SIGNALS, WIRELESS LAN SYSTEM INCLUDING THE SAME, AND WIRELESS LAN METHOD USING THE WIRELESS LAN SYSTEM

BACKGROUND OF THE INVENTION

1. Field of the Invention

The present invention relates to a Local Area Network (LAN), and more particularly, to a wireless Local Area Network (LAN) system and method based on the IEEE802.11 (Ethernet) standard.

2. Description of the Related Art

Generally, a wireless Local Area Network (LAN) system connects personal or public LANs wirelessly to each other so that users can exchange data using mobile terminals, hand phones, PDAs, laptop computers, etc. Particularly, the IEEE 802.11.g standard proposes an integrated processing system that integrates a Direct Sequence Spread Spectrum (DSSS) signal, a Complementary Code Keying (CCK) signal, and the Orthogonal Frequency Division Multiplexing (OFDM) signal, thereby allowing these signals to be processed in one system. The 802.11b standard uses DSSS to disperse the data frame signal over a relatively wide (approximately 30 MHz) portion of the 2.4 GHz frequency band. In order to actually spread the signal, an 802.11 transmitter combines the PPDU with a spreading sequence through the use of a binary adder. The spreading sequence is a binary code. For 1 Mbps and 2 Mbps operation, the spreading code is the 11-chip Barker sequence, which is 10110111000. 5.5 Mbps and 11 Mbps operation of 802.11b doesn't use the Barker sequence, and instead uses complementary code keying (CCK) to provide the spreading sequences at these higher data rates. Complementary Code Keying, uses a set of 64 eight-bit code words to encode data for 5.5 and 11 Mbps data rates in the 2.4 GHz band of 802.11b wireless networking. The code words have unique mathematical properties that allow them to be correctly distinguished from one another by a receiver even in the presence of substantial noise and multipath interference. CCK works in conjunction with the DSSS technology that is specified in the original 802.11 standard. CCK derives a different spreading code based on fairly complex functions depending on the pattern of bits being sent. The modulator simply refers to a table for the spreading sequence that corresponds to the pattern of data bits being sent. This is necessary to obtain the most efficient processing of the data in order to achieve the higher data rates. CCK applies sophisticated mathematical formulas to the DSSS codes, permitting the codes to represent a greater volume of information per clock cycle. The transmitter can then send multiple bits of information with each DSSS code, enough to make possible the 11 Mbps transmission rate. Generally, the DSSS signal is transmitted or received at a transmission rate of approximately 1 Mbps on a 2.4 GHz band, and the CCK signal is transmitted or received at a transmission rate of maximally 11 Mbps on the 2.4 GHz band.

The OFDM signal is generally transmitted or received at a transmission rate of maximally 54 Mbps on a high frequency band of 5.4 GHz as defined in the IEEE 802.11.a standard. However, since the integrated processing system proposed in the IEEE 802.11.g standard should use an RF module, a frequency band of approximately 20 MHz among the 2.4 GHz band (2.4 GHz-2.4835 GHz) was proposed for this system.

A general technique and system for transmitting the DSSS signal, the CCK signal, or the OFDM signal are disclosed in detail in U.S. Pat. No. 6,256,508 and U.S. Pat. Publication No. 2002/0159422.

Figure 1:
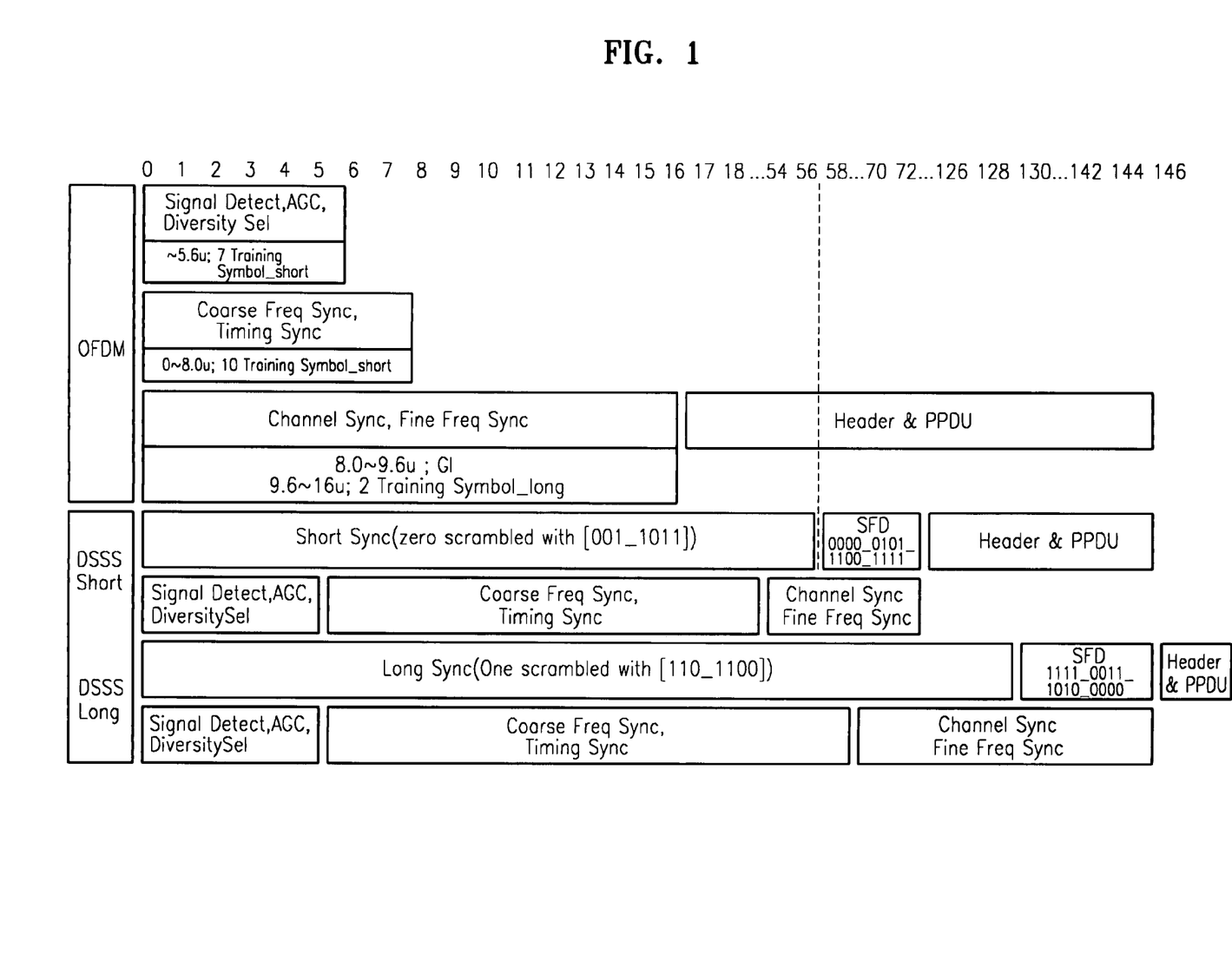
FIG. 1 is a timing diagram showing general structures of a DSSS signal and an OFDM signal.

FIG. 1 is a timing diagram showing general structures of a DSSS signal and an OFDM signal.

To determine whether an input signal is a DSSS signal or an OFDM signal, a preamble processing step is performed. Referring to FIG. 1, the DSSS signal and CCK signal are subjected to a preamble processing step ("Signal Detect") for 56 μs The OFDM signal is subjected to a preamble processing step for 16 μs.

However, while the integrated processing system according to the IEEE 802.11.g standard is capable of transmitting a packet signal (for example, as a DSSS/CCK signal or as a OFDM signal), it may have difficulty distinguishing whether a received signal is a DSSS/CCK signal or an OFDM signal.

The conventional process for receiving DSSS/CCK and OFDM signals proceeds as follows. If a signal existing on an allocated channel in the 2.4 GHz-2.4835 GHz frequency band is extracted using an RF module, the extracted signal is amplified to have a valid amplitude required for signal determination, and is then subjected to a preamble processing step for determining whether the signal is a DSSS/CCK signal or an OFDM signal. The received signal, whose standard is being determined, is demodulated in a next unit and is transferred to a user via a Media Access Control (MAC) layer.

For receiving various signals in an integrated DSSS/CCK and OFDM system, when an AGC-processed analog signal is sampled and converted into a digital signal, a DSSS/CCK signal with a rate of 1 MHz should be sampled in synchronization to a clock signal of 11 MHz/22 MHz/44 MHz, and the OFDM signal with a rate of 20 MHz should be sampled in synchronization to a clock signal of 20 MHz/40 MHz/80 MHz. When determining the standard of a received signal sampled using different sampling clocks, the preamble processing of the received signal has to be completed in a defined preamble period of time, for example, in a preamble time period of 16 μs in a case of an OFDM signal.

SUMMARY OF THE INVENTION

The present invention provides a physical layer unit, and a wireless Local Area Network (LAN) system including the same, capable of receiving various signals by performing a preamble processing step upon an input signal within a predetermined first time period of 16 μs (a preamble processing time period, prescribed in the Orthogonal Frequency Division Multiplexing (OFDM) standard for determining whether the input signal corresponds to the OFDM standard), and performing a second preamble processing step (within the remaining preamble processing time period prescribed for determining whether the input signal corresponds to a DSSS/CCK standard), if the input signal does not correspond to the OFDM standard.

The present invention also provides a wireless LAN method, capable of receiving various signals, by performing first preamble processing of an input signal within a first predetermined time period (e.g., 16 μs is a preamble processing time period prescribed by the OFDM standard for determining whether the input signal corresponds to the OFDM standard), and, if the input signal does not correspond to the OFDM standard, performing a second preamble processing within the remainder of the second preamble processing time period (e.g., a remainder of a period prescribed for determining whether the input signal corresponds to a DSSS/CCK standard).

A physical layer unit of a wireless LAN system according to one aspect of the present invention includes a Physical Layer Convergence Protocol (PLCP) processor, a transmitting processor, and a receiving processor.

The PCLP processor receives a DSSS/CCK demodulation signal, an OFDM demodulation signal, and a packet signal PKTS input from a Media Access Control (MAC) layer, classifies the received signals according to an OFDM standard or a DSSS/CCK standard, relays the classified signals to corresponding upper layers using a PLCP, and performs general control operations.

The transmitting processor receives the packet signal PKTS output from the PLCP processor, performs OFDM modulation or DSSS/CCK modulation of the received signal, and outputs the modulated signal as an OFDM analog signal or a DSSS/CCK analog signal RCA to an RF module.

The receiving processor receives the OFDM analog signal or DSSS/CCK analog signal RCA processed by the RF module, converts the received analog signal into a digital signal, interpolates and demodulates the converted digital signal, outputs the interpolated and demodulated signal as a DSSS/CCK demodulation signal to the PLCP processor, and directly demodulates and outputs the converted digital signal without interpolation as an OFDM demodulation signal to the PLCP processor.

The transmitting processor includes a DSSS/CCK modulator, an OFDM modulator, a multiplexing (MUX) unit, and a D/A converter. The DSSS/CCK modulator receives and modulates the packet signal PKTS of the DSSS/CCK standard and outputs the modulated packet signal as the DSSS/CCK modulation signal to the MUX unit. The OFDM modulator receives and modulates the packet signal PKTS of the OFDM standard and outputs the modulated signal as the OFDM modulation signal to the MUX unit. The MUX unit outputs one of the DSSS/CCK modulation signal or the OFDM modulation signal to the D/A converter, according to a processing sequence. The D/A converter converts the signal output from the MUX unit into an analog signal and outputs the result as an OFDM analog signal or a DSSS/CCK analog signal.

The receiving processor includes an A/D converter, an interpolator, a DSSS/CCK demodulator, and an OFDM demodulator. The A/D converter receives and converts the analog signal processed by the RF module into a digital signal. The interpolator interpolates the converted digital signal. The DSSS/CCK demodulator demodulates and outputs the interpolated signal as a DSSS/CCK demodulation signal to the PLCP processor. The OFDM demodulator directly demodulates and outputs the converted digital signal without interpolation as an OFDM demodulation signal to the PLCP processor.

The interpolation is performed by synchronizing the converted digital signal to a sampling clock corresponding to a transmission rate according to the DSSS/CCK standard and approximating the synchronized digital signal using a third-order or a higher order function.

A physical layer unit of a wireless LAN system according to another aspect of the present invention includes a PLCP processor, a transmitting processor, and a receiving processor.

The PCLP processor receives a DSSS/CCK demodulation signal, an OFDM demodulation signal, and a packet signal PKTS input from a MAC layer, classifies the received signals according to the OFDM standard or the DSSS/CCK standard, relays the classified signals to respective corresponding upper layers using a PLCP, and performs general control operations.

The transmitting processor receives the packet signal PKTS output from the PLCP processor, performs OFDM modulation or DSSS/CCK modulation of the received signal, and outputs the modulated signal as an OFDM analog signal or a DSSS/CCK analog signal RCA.

The receiving processor receives the OFDM analog signal or DSSS/CCK analog signal RCA processed by an RF module, converts the received signal into a digital signal.

The receiving processor demodulates the converted digital signal as an OFDM demodulation signal and outputs the OFDM demodulation signal according to a predetermined DSSS/CCK control in response to signal determination flag information in a first logic state; and demodulates and outputs the converted digital signal as a DSSS/CCK demodulation signal according to a predetermined DSSS/CCK control in response to signal determination flag information in a second logic state. The transmitting processor includes a DSSS/CCK modulator, an OFDM modulator, a MUX unit, and a D/A converter. The DSSS/CCK modulator receives and modulates the packet signal PKTS of the DSSS/CCK standard and outputs the modulated signal as a DSSS/CCK modulation signal to the MUX unit. The OFDM modulator receives and modulates the packet signal PKTS of the OFDM standard and outputs the modulated signal as an OFDM modulation signal to the MUX unit. The MUX unit outputs one of the DSSS/CCK modulation signal or OFDM modulation signal to the D/A converter, according to a processing sequence. The D/A converter converts the signal output from the MUX unit into an analog signal, and outputs the converted signal as an OFDM analog signal or DSSS/CCK analog signal to the RF module.

The receiving processor includes an A/D converter, a DSSS/CCK controller, a DSSS/CCK demodulator, and an OFDM demodulator. The A/D converter receives and converts the analog signal processed by the RF module into a digital signal. The DSSS/CCK controller performs a predetermined DSSS/CCK control corresponding to signal determination flag information and controls the output of the converted digital signal. The DSSS/CCK demodulator demodulates and output the signal received from the DSSS/CCK controller as a DSSS/CCK demodulation signal to the PLCP processor. The OFDM demodulator demodulates the converted digital signal as an OFDM demodulation signal, sets the signal determination flag information to the first logic state or to the second logic state, and outputs the OFDM demodulation signal to the PLCP processor in response to the signal determination flag information in the first logic state.

The predetermined DSSS/CCK control is performed to receive the converted digital signal in response to the signal determination flag information with a second logic state, and to allow the DSSS/CCK controller to conduct a preamble processing of the received signal for a predetermined second time period after the signal determination flag information is set to the second logic state when the DSSS/CCK demodulator generates the DSSS/CCK demodulation signal. The signal determination flag information is set to the first logic state if the received signal corresponds to the OFDM standard, and is set to the second logic state if the received signal does not correspond to the OFDM standard. The predetermined second time period is 40 µs and the predetermined first time period is 16 µs.

A wireless LAN system according to still another aspect of the present invention includes an RF module, a physical layer unit, and a MAC layer unit.

The RF module that receives (extracts from a signal existing on an allocated channel) an OFDM modulation signal or a DSSS/CCK modulation signal as an analog signal and outputs an OFDM analog signal or a DSSS/CCK analog signal;

The physical layer unit receives and converts an analog signal output from the RF module into a digital signal, interpolates and demodulates the digital signal, outputs the interpolated and demodulated signal as a DSSS/CCK demodulation signal, and directly demodulates and outputs the digital signal as an OFDM demodulation signal.

The physical layer unit also receives a packet signal PKTS, performs OFDM modulation or DSSS/CCK modulation of the received signal, outputs an OFDM analog signal or DSSS/CCK analog signal to the RF module.

The MAC layer unit receives information LND received from other interfaced external layers, and processes and outputs the information according to a MAC protocol as a packet signal PKTS. The MAC layer unit also receives the DSSS/CCK demodulation signal or OFDM demodulation signal MCD, and link-distributes and outputs the received signal to the other external layers.

The physical layer unit includes a PLCP processor, a transmitting processor, and a receiving processor. The PLCP processor receives the demodulation signal, classifies the received signals according to the OFDM standard or DSSS/CCK standard, relays the classified signals to respective corresponding upper layers, and performs general control operations. The transmitting processor receives a packet signal PKTS output from the PLCP processor, performs OFDM modulation or DSSS/CCK modulation of the received signal, and outputs the modulated signal as an OFDM analog signal or DSSS/CCK analog signal to the RF module. The receiving processor receives and converts the analog signal received from the RF module into a digital signal, interpolates and demodulates the converted digital signal, outputs the interpolated and demodulated signal as a DSSS/CCK demodulation signal to the PLCP processor, and directly demodulates and outputs the converted digital signal without interpolation as an OFDM demodulation signal to the PLCP processor.

The transmitting processor includes a DSSS/CCK modulator, an OFDM modulator, an MUX unit, and a D/A converter. The DSSS/CCK modulator receives and modulates the packet signal PKTS of the DSSS/CCK standard and outputs the modulated signal as a DSSS/CCK modulation signal to the MUX unit. The OFDM modulator receives and modulates the packet signal PKTS of the OFDM standard, and outputs the modulated signal as an OFDM modulation signal to the MUX unit. The MUX unit outputs one of the DSSS/CCK modulation signal or the OFDM modulation signal to the D/A converter, according to the processing sequence. The D/A converter converts the signal output from the MUX unit into an analog signal and outputs the converted analog signal as an OFDM analog signal or a DSSS/CCK analog signal to the RF module.

The receiving processor includes an A/D converter, an interpolator, a DSSS/CCK demodulator, and an OFDM demodulator. The A/D converter receives and converts the analog signal output from RF module into a digital signal. The interpolator interpolates the converted digital signal. The DSSS/CCK demodulator demodulates and outputs the interpolated signal as a DSSS/CCK demodulation signal to the PLCP processor. The OFDM demodulator directly demodulates and outputs the converted digital signal without interpolation as an OFDM demodulation signal to the PLCP processor.

The interpolation is performed by synchronizing the converted digital signal to a sampling clock corresponding to a transmission rate of the DSSS/CCK standard and approximating the synchronized digital signal using a third-order or a higher order function.

A wireless LAN system according to a further aspect of the present invention includes an RF module, a physical layer unit, and a MAC layer unit.

The RF module receives the OFDM modulation signal or DSSS/CCK modulation signal as an analog signal on an allocated channel, and extracts and outputs an OFDM analog signal or a DSSS/CCK analog signal.

The physical layer unit receives and converts the analog signal output from the RF module into a digital signal, interpolates and demodulates the converted digital signal, outputs the interpolated and demodulated signal as a DSSS/CCK demodulation signal, and directly demodulates and outputs the converted digital signal without interpolation as an OFDM demodulation signal. The MAC layer unit receives information from other interfaced external layers, and processes and outputs the information as a packet signal PKTS to the physical layer unit, according to a MAC protocol. The MAC layer unit also receives the DSSS/CCK demodulation signal or OFDM demodulation signal MCD from physical layer unit, and link-distributes and outputs the received signal to the other external layers.

The physical layer unit receives the packet signal PKTS, performs OFDM modulation or DSSS/CCK modulation of the received signal, outputs an OFDM analog signal or DSSS/CCK analog signal to the RF module.

The physical layer unit includes a PLCP processor, a transmitting processor, and a receiving processor. The PLCP processor receives the demodulation signal, classifies and PLCP-relays the received demodulation signal into the OFDM standard or the DSSS/CCK standard to be output to the external layers, and also performs the whole control of the physical layer unit. The transmitting processor receives the packet signal PKTS output from the PLCP processor, performs OFDM modulation or DSSS/CCK modulation of the received signal, and outputs the modulated signal as the OFDM analog signal or the DSSS/CCK analog signal.

The receiving processor receives and converts the analog signal output from the RF module into a digital signal; outputs the converted digital signal as an OFDM demodulation signal, according to a predetermined DSSS/CCK control, in response to signal determination flag information in a first logic state, the signal determination flag information being set by processing the converted digital signal; and demodulates and outputs the converted digital signal as a DSSS/CCK demodulation signal, according to the predetermined DSSS/CCK control, in response to signal determination flag information in a second logic state. The transmitting processor includes a DSSS/CCK modulator, an OFDM modulator, and a DIA converter. The DSSS/CCK modulator receives and modulates the packet signal PKTS of the DSSS/CCK standard and outputs the modulated signal as the DSSS/CCK modulation signal to the MUX unit. The OFDM modulator receives and modulates the packet signal PKTS of the OFDM standard and outputs the modulated signal as the OFDM modulation signal to the MUX unit. The MUX unit outputs one of the DSSS/CCK modulation signal or the OFDM modulation signal to the D/A converter, according to the processing sequence. The D/A converter converts the signal output from the MUX unit into an analog signal and outputs the converted analog signal as the OFDM analog signal or the DSSS/CCK analog signal to the RF module.

The receiving processor includes an A/D converter, a DSSS/CCK controller, a DSSS/CCK demodulator, and an OFDM demodulator. The A/D converter receives and converts the analog signal output from the RF module into a digital signal. The DSSS/CCK controller controls the output of the converted digital signal, according to the predetermined DSSS/CCK control corresponding to the signal determination flag information. The DSSS/CCK demodulator demodulates and outputs the signal output from the DSSS/CCK controller as the DSSS/CCK demodulation signal to the PLCP processor. The OFDM demodulator demodulates the converted digital signal, sets the signal determination flag information to the first logic state or to the second logic state, and outputs the demodulated signal as the OFDM demodulation signal to the PLCP processor in response to the signal determination flag information in the first logic state.

The predetermined DSSS/CCK control is performed in a manner to receive the converted digital signal in response to the signal determination flag information with the second logic state, and to allow the DSSS/CCK controller to conduct a second preamble processing of the received signal within the predetermined second time period after the signal determination flag information is set to the second logic state. The signal determination flag information is set to the first logic state if the converted digital signal corresponds to the OFDM standard, and is set to the second logic state if the converted digital signal does not correspond to the OFDM standard.

A wireless LAN method according to a further aspect of the present invention comprises the following steps.

First, the wireless LAN system receives a radio wave and extracts and outputs an OFDM analog signal or DSSS/CCK analog signal RCA from a signal existing on an allocated channel. Then, the wireless LAN system converts the analog signal into a digital signal, interpolates and demodulates the converted digital signal, outputs the interpolated and demodulated signal as a DSSS/CCK demodulation signal. And, the wireless LAN system directly demodulates and outputs the converted digital signal as an OFDM demodulation signal. Accordingly, the wireless LAN system receives and link-distributes the DSSS/CCK demodulation signal or the OFDM demodulation signal MCD, and outputs the link-distributed signal to the other external layers. The interpolation is performed by synchronizing the converted digital signal to a sampling clock corresponding to a transmission rate of the DSSS/CCK standard and approximating the synchronized digital signal using a third-order or a higher order function.

A wireless LAN method according to still another aspect of the present invention comprises the following steps. The wireless LAN system receives a radio wave and extracts (from a signal existing on an allocated channel) and outputs an OFDM analog signal or a DSSS/CCK analog signal. Next, the wireless LAN system converts the analog signal into a digital signal, processes the converted digital signal, sets signal determination flag information to a first logic state or to a second logic state, performs a predetermined DSSS/CCK control corresponding to the signal determination flag information, and controls the output of the converted digital signal. Next, the wireless LAN system processes and outputs the output signal as the outputs the converted digital signal as an OFDM demodulation signal in response to signal determination flag information in a first logic state; or demodulates and outputs the converted digital signal as a DSSS/CCK demodulation signal, according to the predetermined DSSS/CCK control, in response to signal determination flag information in a second logic state.

Accordingly, the wireless LAN system receives and link-distributes the DSSS/CCK demodulation signal or the OFDM demodulation signal MCD and outputs the link-distributed signal to the other external layers.

The predetermined DSSS/CCK control is performed in a manner to receive the converted digital signal in response to the signal determination flag information with the second logic state, and to allow the DSSS/CCK controller to conduct a second preamble processing of the received signal within the predetermined second time period after the signal determination flag information is set to the second logic state. The signal determination flag information is set to the first logic state if the converted digital signal corresponds to the OFDM standard, and is set to the second logic state if the converted digital signal does not correspond to the OFDM standard. The predetermined second time period is 40 µs and the predetermined first time period is 16 µs.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the appended drawings, wherein the same reference number in the respective drawings represents the same component.

Figure 2:
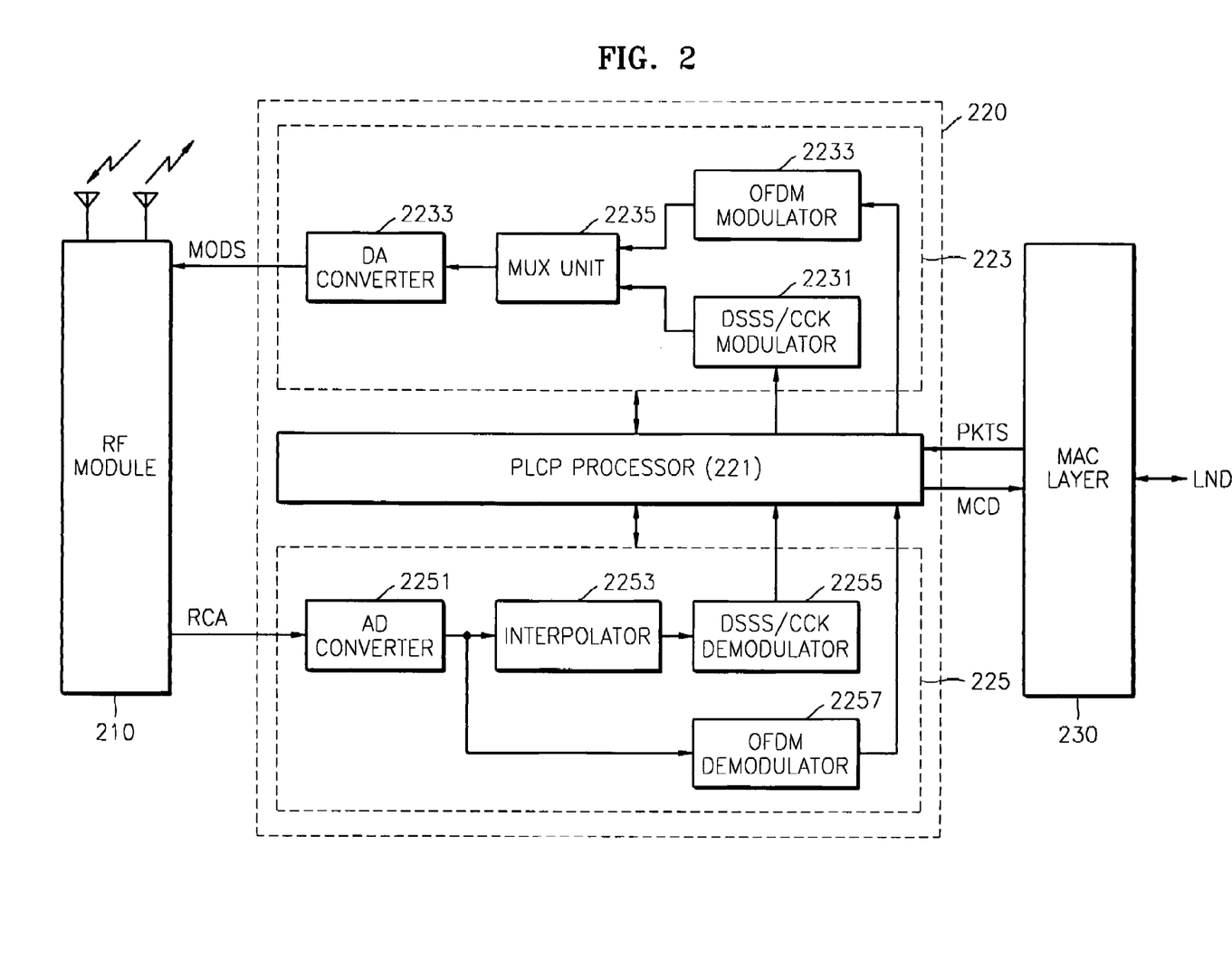
FIG. 2 is a block diagram depicting a wireless LAN system performing a parallel receiving method, according to an embodiment of the present invention.

FIG. 2 is a block diagram of a wireless Local Area Network (LAN) system using a parallel receiving method, according to an embodiment of the present invention.

Referring to FIG. 2, the wireless LAN system includes an RF module 210, a physical layer unit 220, and a Media Access Control (MAC) unit 230.

The physical layer unit 220 includes a Physical Layer Convergence Procedure (PLCP) processor 221, a transmitting processor 221, and a receiving processor 225.

The RF module 210 receives a radio wave, and extracts and outputs an analog signal RCA to the physical layer unit 220, and more particularly, to a receiving processor 225. The RF module 210 also receives an OFDM demodulation signal or a DSSS/CCK demodulation signal MODS as an analog signal, and transmits the received signal on a carrier signal.

The physical layer unit 220, and more particularly, to a receiving processor 225 therein, receives and converts the (OFDM or DSSS/CCK ) analog signal RCA output from the RF module 210 into a digital signal. The physical layer unit 220 interpolates and demodulates the digital signal, outputs the converted (e.g., the interpolated and demodulated) digital signal as a DSSS/CCK demodulation signal, or as an OFDM demodulation signal. The interpolation is performed by synchronizing the converted digital signal to a sampling clock corresponding to a transmission rate of the DSSS/CCK standard and approximating the synchronized digital signal using a third-order or a higher order function. The physical layer unit 220 also receives a packet signal (PKTS) from the MAC unit 230, performs OFDM modulation or a DSSS/CCK modulation of the received signal, and outputs the modulated signal as an OFDM analog signal or a DSSS/CCK analog signal.

The receiving processor 225 receives and converts the analog signal RCA output from the RF module 210 into a digital signal, interpolates and demodulates the converted digital signal, outputs the interpolated and demodulated signal as a DSSS/CCK demodulation signal to the PLCP processor 221, or directly demodulates and outputs the converted digital signal without interpolation as an OFDM demodulation signal to the PLCP processor 221.

The MAC unit 230 receives and link-distributes a DSSS/CCK demodulation signal or an OFDM demodulation signal MCD subjected to PLCP-relay by a Physical Layer Convergence Procedure (PLCP) processor 221, and outputs the result to other interfaced external layers. The MAC unit 230 also receives information LND received from other interfaced external layers, and processes and outputs the information as a packet signal PKTS, according to a MAC protocol, to the Physical Layer Convergence Procedure (PLCP) processor 221.

The Physical Layer Convergence Procedure (PLCP) processor 221 receives the demodulation signal (from the receiving processor 225), classifies the received signals according to the OFDM standard or the DSSS/CCK standard, relays the classified signals to respective corresponding upper layers using a Physical Layer Convergence Procedure (PLCP), and performs general control operations. The transmitting processor 223 receives the packet signal PKTS via the Physical Layer Convergence Procedure (PLCP) processor 221, performs OFDM modulation or DSSS/CCK modulation of the packet signal PKTS, and outputs the modulated signal MODS as an OFDM analog signal or a DSSS/CCK analog signal.

The transmitting processor 223 includes a DSSS/CCK demodulator 2231, an OFDM modulator 2233, a multiplexing (MUX) unit 2235, and a D/A converter 2237. The DSSS/CCK modulator 2231 receives and modulates a packet signal PKTS of the DSSS/CCK standard and outputs the modulated signal as a DSSS/CCK modulation signal to the MUX unit 2235. The OFDM modulator 2233 receives and modulates a packet signal PKTS of the OFDM standard and outputs the modulated signal as an OFDM modulation signal to the MUX unit 2235. The MUX unit 2235 outputs one of the DSSS/CCK modulation signal or the OFDM modulation signal to the D/A converter, according to a processing sequence. The D/A converter 2237 converts the modulation signal output from the MUX unit 2235 into an analog signal and outputs the analog signal as an OFDM analog signal or a DSSS/CCK analog signal.

The receiving processor 225 includes an A/D converter 2251, an interpolator 2253, a DSSS/CCK demodulator 2255, and an OFDM demodulator 2257. The A/D converter 2251 receives and converts the analog signal output from the RF module 210 into a digital signal. In the present embodiment of the invention using a parallel receiving method, the DSSS/CCK demodulator 2255, and the OFDM demodulator 2257 both demodulate the digital signal received from the Analog-To-Digital Converter 2251 when received. The interpolator 2253 interpolates and outputs the digital signal to the DSSS/CCK demodulator 2255. The interpolation is performed by synchronizing the digital signal to a sampling clock corresponding to a transmission rate of the DSSS/CCK standard and approximating the synchronized digital signal using a third-order or a higher order function. The DSSS/CCK demodulator 2255 demodulates and outputs the interpolated signals as a DSSS/CCK demodulation signal to the PLCP processor 221. The OFDM demodulator 2257 directly demodulates and outputs the digital signal without interpolation as an OFDM demodulation signal.

Now, the operations of the wireless LAN system using the parallel receiving method according to an embodiment of the present invention will be described in detail.

Figure 3A:
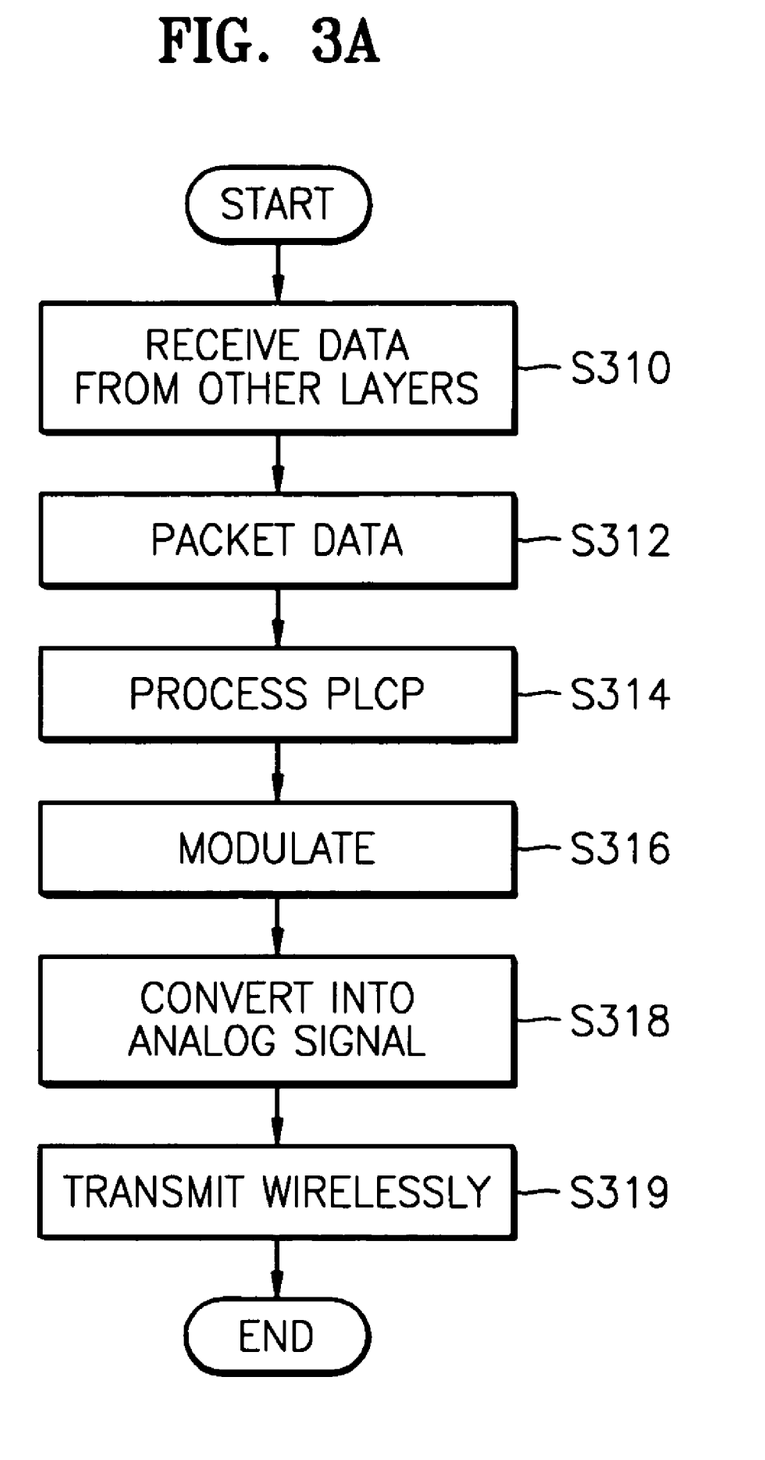
FIGS. 3A and 3B are flow charts for explaining operation of the wireless LAN system of FIG. 1.
Figure 3B:
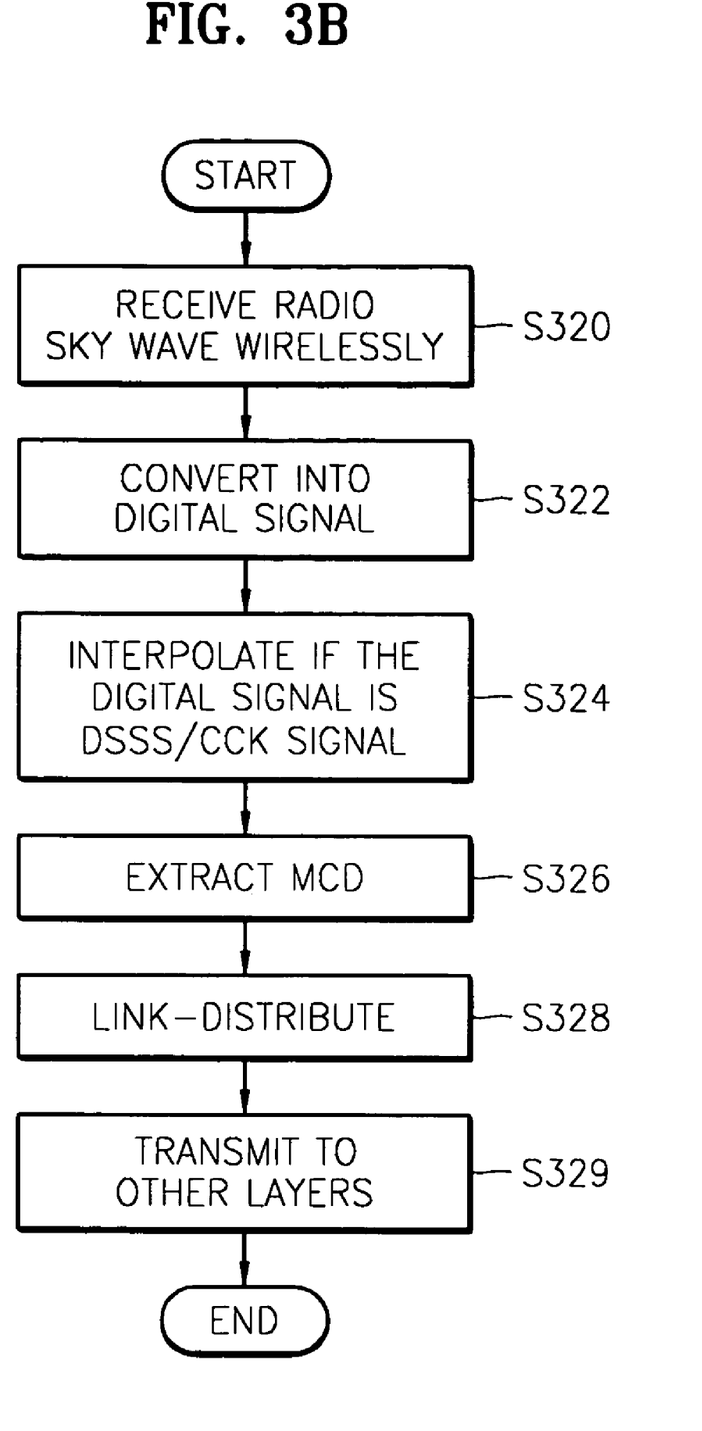

FIGS. 3A and 3B are flow charts for explaining the operations of the wireless LAN system of FIG. 1. FIG. 3A is a flow chart for explaining a transmitting process of the wireless LAN system of FIG. 1 and FIG. 3B is a flow chart for explaining a receiving process of the wireless LAN system of FIG. 1.

Referring to FIG. 3A, the MAC unit 230 receives and processes information LND from other interfaced external layers (step S310), and outputs the received information as a packet signal PKTS to the physical layer unit (step S312). The IEEE 802.11 standard includes a common Medium Access Control (MAC) Layer, which defines protocols that govern the operation of the wireless LAN.

The PLCP processor 221 receives and classifies the packet signal PKTS according to the OFDM standard or the DSSS/CCK standard, and relays the classified signal to a corresponding modulator (e.g. 2233 or 2231 in a transmitting processor 223) using a Physical Layer Convergence Procedure (PLCP) (step S314). The IEEE 802.11b standard includes a Physical Layer Convergence Procedure (PLCP) and several alternative physical layers that specify the transmission and reception of 802.11 frames. The PLCP prepares 802.11 frames for transmission. The PLCP takes each 802.11 frame to be transmitted and forms what the 802.11 standard refers to as a PLCP protocol data unit (PPDU).

The transmitting processor 223 of the physical layer unit 220 receives the packet signal PKTS, performs OFDM modulation or DSSS/CCK modulation of the received PKTS signal (step S316), and outputs the modulated signal as an OFDM analog signal or an DSSS/CCK analog signal to the RF module 210 (step S318). The RF module 210 receives the OFDM modulation signal or the DSSS/CCK modulation signal as an analog signal MODS, and transmits the received signal on a carrier signal (step S319).

Referring to FIG. 3B, the RF module 210 receives a radio wave, and extracts and outputs an analog signal analog signal RCA to the receiving processor 225 of the physical unit 220 (step S320). Accordingly, the receiving processor 225 of the physical unit 220 receives and converts the analog signal RCA output from the RF module 210 into a digital signal (step S322), interpolates and demodulates the converted digital signal (step S324), outputs the interpolated and demodulated signal as a DSSS/CCK demodulation signal to the PLCP processor 221, and also directly demodulates and outputs the converted digital signal without interpolation as an OFDM demodulation signal to the PLCP processor 221. The interpolation is performed by synchronizing the converted digital signal to a sampling clock corresponding to a transmission rate of the DSSS/CCK standard and approximating the synchronized digital signal using a third-order or a higher order function.

The MAC layer unit 230 receives and link-distributes the DSSS/CCK demodulation signal or the OFDM demodulation signal relayed by the PLCP processor 221 (step S328) and outputs the link-distributed signals to the other external layers (step S329).

Figure 4:
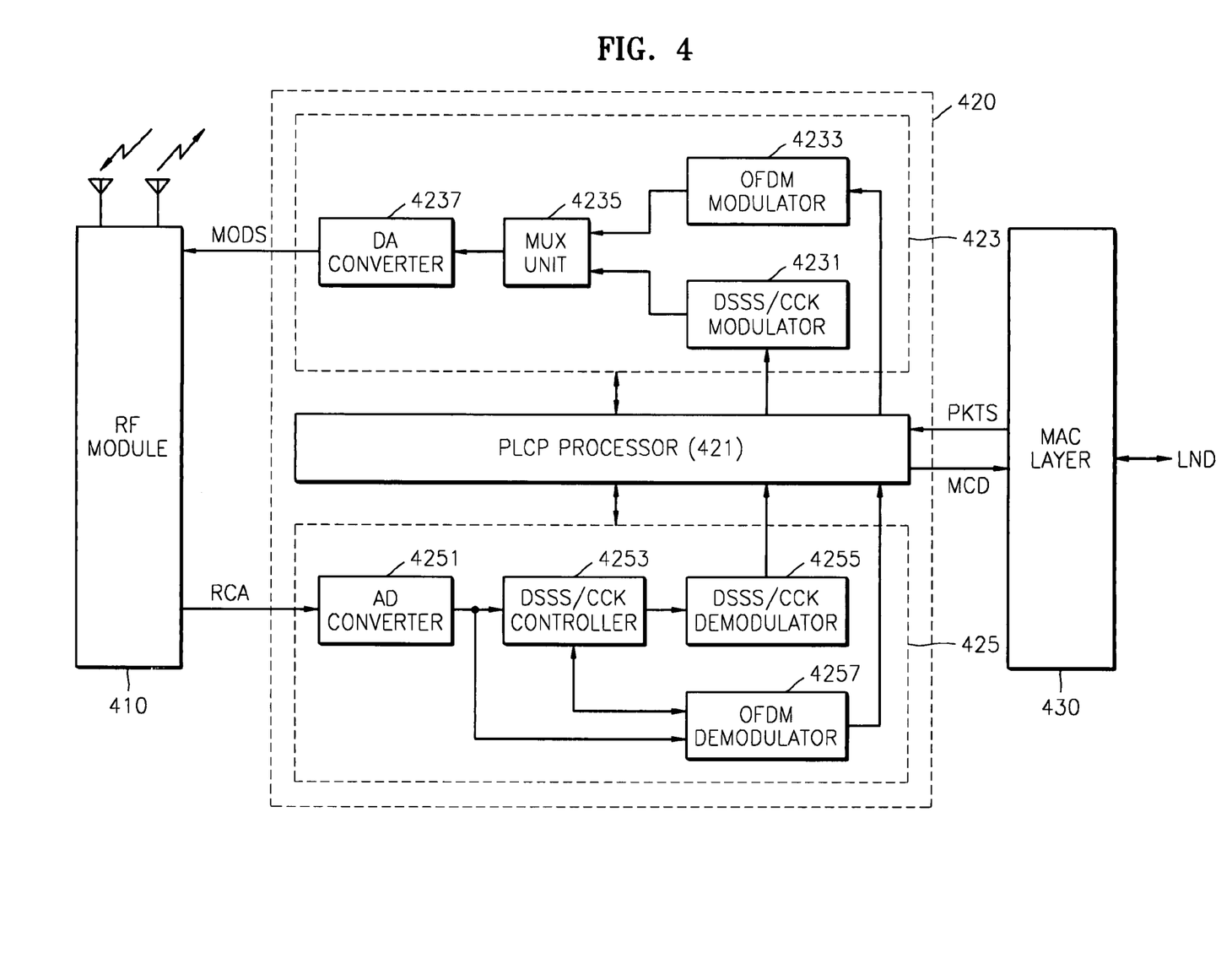
FIG. 4 is a block diagram of a wireless LAN system using a serial receiving method, according to another embodiment of the present invention.

FIG. 4 is a block diagram of a wireless LAN system using a serial receiving method, according to another embodiment of the present invention.

Referring to FIG. 4, the wireless LAN system using the serial receiving method includes a RF module 410, a physical layer unit 420, and a MAC layer unit 430. In FIG. 4, the operation (methods) of the receiving processor 425 of the physical layer unit 420 is different from that of the receiving processor 225 of the physical layer unit 220 of FIG. 2. The operation and functions of the remaining units (421, 423) are the same as those of the corresponding units of FIG. 2. More specifically, the respective operation and functions of the RF module 410 and MAC layer unit 430 of FIG. 4 are the same as those of the RF module 210 and MAC layer unit 230 of FIG. 2, and the operation and function of the transmitting processor 423 of the physical layer unit 420 of FIG. 4 is also the same as that of the transmitting processor 223 of the physical layer unit 220 of FIG. 2.

The RF module 410 receives a radio wave signal existing on an allocated channel, and extracts and outputs an OFDM analog signal or DSSS/CCK analog signal RCA to the receiving processor 425. Also, the RF module 410 receives an OFDM modulation signal or a DSSS/CCK modulation signal from the transmitting processor 423 as an analog signal MODS.

The physical layer unit 420 includes a Physical Layer Convergence Protocol (PLCP) processor 421, a transmitting processor 423, and a receiving processor 425.

The physical layer unit 420 receives and converts the analog signal RCA output from the RF module 410 into a digital signal. The physical layer unit 420 demodulates and outputs the converted digital signal as a DSSS/CCK demodulation signal, according to a predetermined DSSS/CCK control corresponding to signal determination flag information, and demodulates and outputs the converted digital signal as an OFDM demodulation signal, in response to signal determination flag information in a first logic state resulting from processing the converted digital signal. The physical layer unit 420 also receives a packet signal PKTS from the MAC unit 430, performs OFDM modulation or DSSS/CCK modulation of the packet signal PKTS, and outputs the modulated signal as an OFDM analog signal or a DSSS/CCK analog signal MODS to the RF module 410.

The MAC layer unit 430 receives information LND from the other interfaced external layers, and processes and outputs the LND as a packet signal PKTS to the PLCP processor 421, according to a MAC protocol. Also, the MAC layer unit 430 receives and link-distributes the DSSS/CCK demodulation signal or the OFDM demodulation signal MCD subjected to PLCP-relay, and outputs the link-distributed demodulation signal to the other external layers.

The PLCP processor 421 receives the demodulation signals, classifies the received signals according to the DSSS/CCK standard, relays the classified signals to respective corresponding upper layers using a Physical Layer Convergence Protocol (PLCP), and performs general control operations.

The receiving processor 425 receives and converts the analog signal RCA output from the RF module 410 into a digital signal, demodulates and outputs the converted digital signal as a DSSS/CCK demodulation signal, according to a predetermined DSSS/CCK control corresponding to signal determination flag information, and demodulates and outputs the converted digital signal as an OFDM demodulation signal in response to signal determination flag information in a first logic state resulting from processing the converted digital signal. The predetermined DSSS/CCK control is performed to receive the converted digital signal in response to the signal determination flag information in a second logic state, and to allow the DSSS/CCK controller 4253 to conduct a second preamble processing of the received converted digital signal within a predetermined second time period after the signal determination flag information is set to a second logic state. The signal determination flag information is set to a second logic state when a DSSS/CCK demodulation signal is generated from the DSSS/CCK demodulator 4255. The signal determination flag information is set to the first logic state if the converted digital signal corresponds to the OFDM standard, and is set to the second logic state if the converted digital signal does not correspond to the OFDM standard. In preferred embodiments of the invention, the predetermined second time period is 40 µs and the predetermined first time period is 16 µs.

The transmitting processor 423 includes a DSSS/CCK modulator 4231, an OFDM modulator 4233, a MUX unit 4235, and a D/A converter 4237. The DSSS/CCK modulator 4231 receives and modulates the packet signal PKTS of the DSSS/CCK standard and outputs the modulated signal as a DSSS/CCK modulation signal to the MUX unit 4235. The OFDM modulator 4233 receives and modulates the packet signal PKTS of an OFDM standard and outputs the modulated packet signal as an OFDM modulation signal to the MUX unit 4235. The MUX unit 4235 outputs one of the DSSS/CCK modulation signal and the OFDM modulation signal to the D/A converter 4237, according to a processing sequence. The Digital-to-Analog (D/A) converter 4237 converts the signal output from the MUX unit 4235 into an analog signal, and outputs the result as an OFDM analog signal or a DSSS/CCK analog signal.

The receiving processor 425 includes an Analog-to-Digital (A/D) converter 4251, a DSSS/CCK controller 4253, a DSSS/CCK demodulator 4255, and an OFDM demodulator 4257. The A/D converter 4251 receives and converts the analog signal RCA output from the RD module 410 into a (converted) digital signal. The DSSS/CCK controller 4253 performs the predetermined DSSS/CCK control corresponding to the signal determination flag information and controls the output of the converted digital signal to the DSSS/CCK demodulator 4255. The DSSS/CCK demodulator 4255 demodulates the digital signal output from the DSSS/CCK controller 4253 and outputs the demodulated signal to the PLCP processor 421 as a DSSS/CCK demodulation signal. The OFDM demodulator 4257 demodulates the converted digital signal within a predetermined first time period, sets the signal determination flag information to the first logic state or to second logic state, and outputs the demodulated signal as an OFDM demodulation signal in response to the signal determination flag information being set to the first logic state. The signal determination flag information is set to the first logic state if the converted digital signal corresponds to the OFDM standard, and is set to the second logic state if the converted digital signal does not correspond to the OFDM standard. In response to the signal determination flag information being set to the second logic state, he predetermined DSSS/CCK control is performed in a manner to receive the converted digital signal, and to allow the DSSS/CCK controller to conduct a preamble processing of the received signal and to output the DSSS/CCK demodulation signal within the predetermined second time period after the signal determination flag information is set to the second logic state. In preferred embodiments of the invention, the predetermined first time period is 16 µs and the predetermined second time period is 40 µs starting no later than the end of the predetermined first time period.

The operations of the wireless LAN system using the serial receiving process, according to another embodiment of the present invention will be described in more detail.

Figure 5:
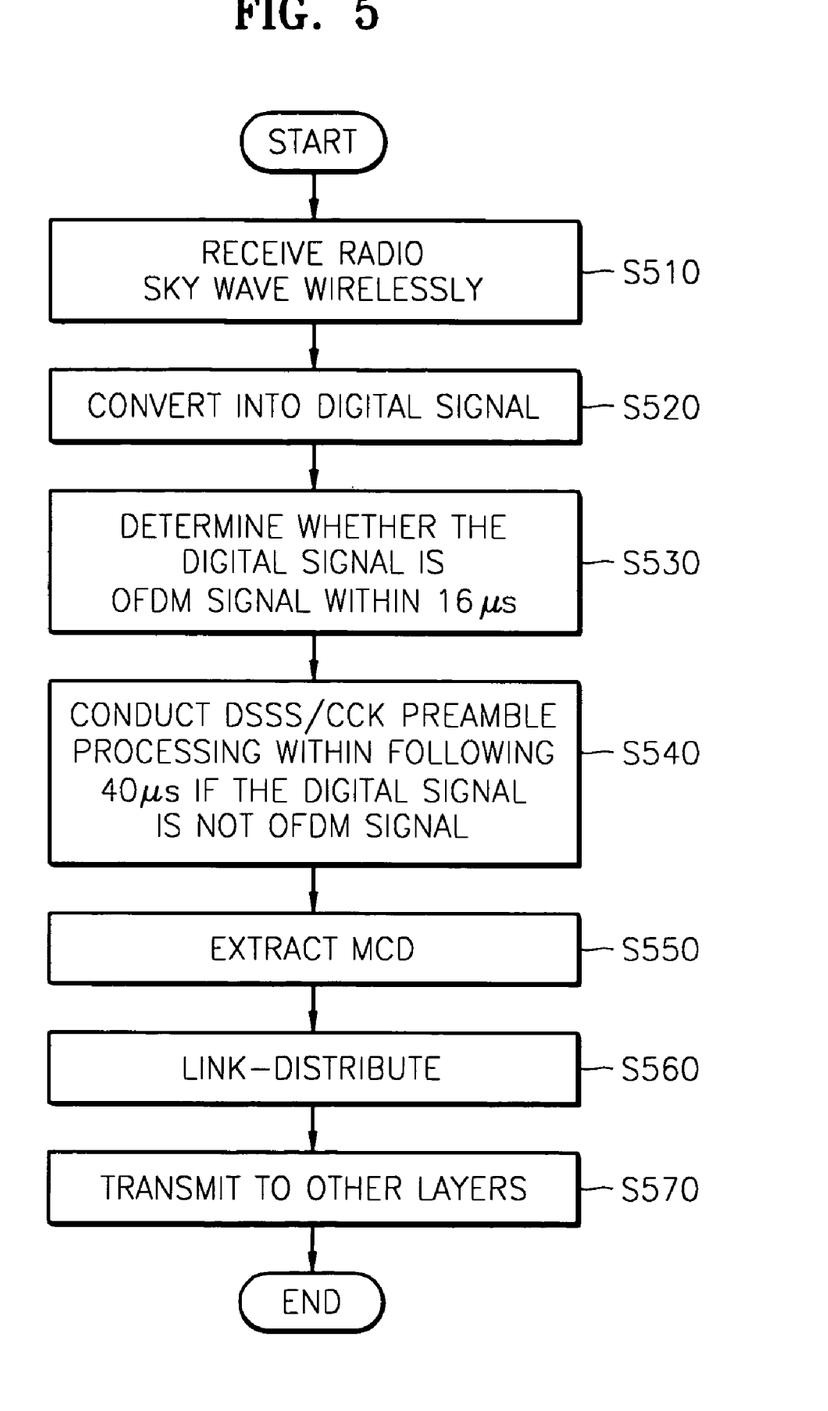
FIG. 5 is a flow chart for explaining the operation of the wireless LAN system of FIG. 4.

FIG. 5 is a flow chart for explaining the operation of the wireless LAN system of FIG. 4. The transmission processing operation of the wireless LAN system of FIG. 4 is the same as that of the transmission processing operation of the wireless LAN system of FIG. 2, and accordingly, the description therefor is omitted. Below, the receiving process operation of the wireless LAN system of FIG. 4 is described with reference to FIG. 5.

Referring to FIG. 5, the RF module 410 receives the radio wave and extracts and outputs an analog signal analog signal RCA from a signal existing on an allocated channel (step S510). The physical layer unit 420 receives and converts the analog signal RCA output from the RF module 410 into a digital signal (step S520). The physical layer unit 420 demodulates and outputs the converted digital signal as a DSSS/CCK demodulation signal (according to a predetermined DSSS/CCK control corresponding to signal determination flag information in a second logic state resulting from processing that determines that the converted digital signal is not an OFDM signal), or demodulates and outputs the converted digital signal as an OFDM demodulation signal-(in response to signal determination flag information in a first logic state resulting from processing the converted digital signal. The signal determination flag information is set to the first logic state if the converted digital signal corresponds to the OFDM standard. The signal determination flag information is set to the second logic state if the converted digital signal does not correspond to the OFDM standard. When the signal determination flag information is set to the second logic state, the predetermined DSSS/CCK control is performed in a manner to allow the DSSS/CCK controller 4253 to receive the converted digital signal and to conduct a preamble processing of the received signal within a predetermined second time period, (e.g., within a time period of 40 μs remaining after subtracting the predetermined first time period 16 μs from a preamble time period of 56 μs prescribed by the OFDM standard) and the to allow the DSSS/CCK demodulator 4255 to generate the DSSS/CCK demodulation signal. The MAC layer unit 430 receives the DSSS/CCK demodulation signal or OFDM demodulation signal subjected to a PLCP-relay (step S550), link-distributes the received signal (step S560), and outputs the link-distributed signal to the other external layers (step S570).

Figure 6:
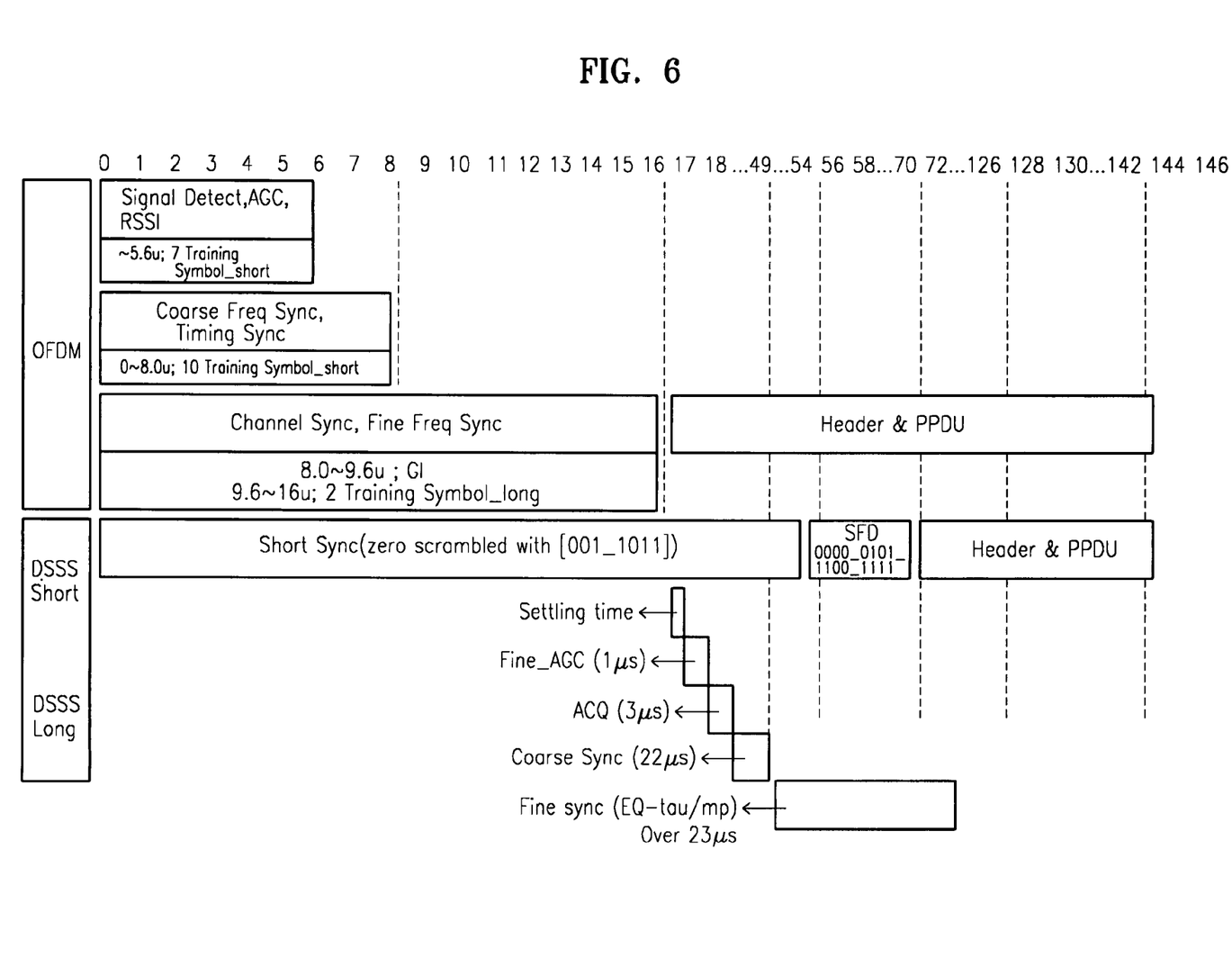
FIG. 6 is a timing diagram showing structures of a DSSS signal and an OFDM signal, and the operation of the wireless LAN system of FIG. 4.

FIG. 6 is a timing diagram showing structures of a DSSS signal and an OFDM signal, and the operation of the wireless LAN system of FIG. 4.

Referring to FIG. 6, according to the OFDM standard, a signal existing on an allocated channel from 2.4 GHz to 2.4835 GHz is extracted within 16 μs. The amplitude of the extracted signal is amplified to a valid amplitude (e.g., by a Auto Gain Control (AGC)). Therefore, the converted digital signal is subjected to the first (OFDM) preamble processing within the predetermined first time period, (e.g., within a preamble time period of 16 μs according to the OFDM standard) (step S530). As a result of the determination made in the first (OFDM) preamble processing, if the signal does not correspond to the OFDM standard, the signal determination flag information is set to the second logic state. After the signal determination flag information is set to the second logic state The DSSS/CCK controller 4253 performs a second (DSSS/CCK) preamble processing of the received signal within the predetermined second time period, (e.g., within the second preamble time period of 40 μs remaining after subtracting the predetermined first time period of 16 μs from a preamble time period of 56 μs prescribed according to the OFDM standard), and the DSSS/CCK demodulator 4255 generates the DSSS/CCK demodulation signal (step S540).

In FIG. 6, the predetermined second time period, (e.g., 40 μs) includes a settling time for signal stability upon switching from an OFDM sampling clock to a DSSS/CCK sampling clock), an AGC time (Fine_AGC) for amplifying the amplitude of a signal to a valid amplitude required for signal determination, an ACQ time for extracting valid data using a Barker code, and a synchronization time (Coarse Sync & Fine sync) for extracting data.

As described above, the wireless LAN system according to the present invention includes a physical layer unit capable of determining an OFDM preamble or a DSSS/CCK preamble using a parallel receiving process or a serial receiving process. The physical layer unit using the parallel receiving process receives and converts the analog signal output from the RF module 410 into a digital signal, interpolates and demodulates the converted digital signal, outputs the interpolated and demodulated signal as the DSSS/CCK demodulation signal, and directly demodulates and outputs the converted digital signal without interpolation as the OFDM demodulation signal. The physical layer unit using the serial receiving process receives and converts the analog signal output from the RF module 410 into a digital signal, outputs the converted digital signal as the OFDM demodulation signal in response to the signal determination flag information being set to a first logic state resulting from detection of an OFDM standard signal; or demodulates and outputs the converted digital signal as a DSS/CCK demodulation signal, according to the predetermined DSSS/CCK control corresponding to signal determination flag information being set to a second logic state resulting from non-detection of an OFDM standard signal.

As described above, the wireless Local Area Network (LAN) system according to the present invention is capable of receiving various signals, by performing a first preamble processing of an input signal within a predetermined first time period (of 16 μs according to an Orthogonal Frequency Division Multiplexing (OFDM) standard for determining whether the input signal corresponds to the OFDM standard), and performing a second preamble processing for determining whether the input signal corresponds to a DSSS/CCK standard, within a second preamble processing time period, if the input signal does not correspond to the OFDM standard. Therefore, DSSS/CCK and OFDM signals can be transmitted and received reliably in the integrated wireless LAN system according to the IEEE 802.11.g standard.

While the present invention has been particularly shown and described with reference to exemplary embodiments thereof, it will be understood by those of ordinary skill in the art that various changes in form and details may be made therein without departing from the spirit and scope of the present invention which is defined by the following claims.

What is claimed is:

1. A physical layer unit for a wireless Local Area Network (LAN) system, the physical layer unit comprising:

an Analog-to-Digital (A/D) converter that receives and converts an OFDM analog signal or a DSSS/CCK analog signal processed by an RF module into a digital signal; and a receiving processor that:
    performs OFDM preamble processing of the received converted digital signal within a first predetermined time period;
    performs DSSS/CCK preamble processing of the received converted digital signal within a second predetermined time period;
    interpolates and demodulates the converted digital signal, outputs the interpolated and demodulated signal as a DSSS/CCK demodulation signal when the DSSS/CCK preamble processing is performed before the ODFM preamble processing; and directly demodulates the converted digital signal without interpolation, and outputs the demodulated signal as an OFDM demodulation signal when the OFDM preamble processing is performed before the DSSS/CCK preamble processing.

2. The physical layer unit of claim 1, further comprising;

a Physical Layer Convergence Protocol (PLCP) processor which receives a DSSS/CCK demodulation signal, an OFDM demodulation signal, and classifies the received signals according to an OFDM standard or a DSSS/CCK standard, relays the classified signals to respective corresponding upper layers using a PLCP, and performs general control operations; and a transmitting processor which receives a packet signal output from the PLCP processor, performs OFDM modulation or DSSS/CCK modulation of the packet signal, and outputs the modulated signal as an OFDM analog signal or a DSSS/CCK analog signal to the RF module, wherein the transmitting processor comprises:
a DSSS/CCK modulator which receives and modulates a packet signal of a DSSS/CCK standard, and outputs the modulated signal as a DSSS/CCK modulation signal;
an OFDM modulator which receives and modulates a packet signal of an OFDM standard, and outputs the modulated signal as an OFDM modulation signal;
a multiplexing (MUX) unit which outputs one of the DSSS/CCK modulation signal and the OFDM modulation signal according to a processing sequence; and
A D/A converter which converts a signal output from the MUX unit into an analog signal and outputs the converted signal as the OFDM analog signal or the DSSS/CCK analog signal.

3. The physical layer unit of claim 1, wherein the receiving processor comprises:
the A/D converter that receives and converts the analog signal processed by the RF module into the digital signal;
an interpolation unit that interpolates and outputs the converted digital signal; a
DSSS/CCK demodulator which demodulates the interpolated signal and outputs the demodulated signal as the DSSS/CCK demodulation signal; and
an OFDM demodulator which directly demodulates the converted digital signal and outputs the demodulated signal as the OFDM demodulation signal.

4. The physical layer unit of claim 1, wherein the interpolation is performed by synchronizing the converted digital signal to a sampling clock corresponding to a transmission rate of the DSSS/CCK standard and approximating the synchronized digital signal using a third-order or a higher order function.

5. A physical layer unit for a wireless LAN system, the physical layer unit comprising:
an Analog-to-Digital (A/D) converter that receives and converts an OFDM analog signal or a DSSS/CCK analog signal processed by an RF module into a digital signal; and
a receiving processor that:
performs OFDM preamble processing of the received converted digital signal within a first predetermined time period;
demodulates the converted digital signal as an OFDM demodulation signal and outputs the OFDM demodulation signal according to a predetermined DSSS/CCK control in response to signal determination flag information in a first logic state when the OFDM preamble processing is successfully performed; and
performs a DSSS/CCK preamble processing of the received converted digital signal within a second predetermined time period when the OFDM preamble processing is not successfully performed;
interpolates, demodulates and outputs the converted digital signal as a DSSS/CCK demodulation signal according to a predetermined DSSS/CCK control in response to signal determination flag information in a second logic state when the DSSS/CCK preamble processing is successfully performed.

6. The physical layer unit of claim 5, further comprising:
a Physical Layer Convergence Protocol (PLCP) processor which receives a DSSS/CCK demodulation signal, a OFDM demodulation signal, and classifies the received signals according to an OFDM standard or a DSSS/CCK standard, relays the classified signals to respective corresponding upper layers using a PLCP, and performs general control operations; and
a transmitting processor which receives a packet signal output from the PLCP processor, performs OFDM modulation or DSSS/CCK modulation of the packet signal, and outputs the modulated signal as an OFDM analog signal or a DSSS/CCK analog signal;
wherein the transmitting processor comprises:
a DSSS/CCK modulator which receives and modulates a packet signal of a DSSS/CCK standard, and outputs the modulated signal as a DSSS/CCK modulation signal;
an OFDM modulator which receives and modulates a packet signal of an OFDM standard, and outputs the modulated signal as an OFDM modulation signal;
a MUX unit which outputs one of the DSSS/CCK modulation signal and the OFDM modulation signal according to a processing sequence; and
a D/A converter which converts a signal output from the MUX unit into an analog signal, and outputs the converted analog signal as the OFDM analog signal or the DSSS/CCK analog signal.

7. The physical layer unit of claim 5, wherein the receiving processor comprises:
the A/D converter that receives the analog signal processed by the RF module and converts the received analog signal into the digital signal;
a DSSS/CCK controller which performs the predetermined DSSS/CCK control corresponding to the signal determination flag information and controls an output of the converted digital signal;
an OFDM demodulator which demodulates the converted digital signal, sets the signal determination flag information to a first logic state or a second logic state, and outputs the demodulated signal as the OFDM demodulation signal in response to the signal determination flag information set to the first logic state; and
a DSSS/CCK demodulator which outputs the demodulated signal as the DSSS/CCK demodulation signal in response to the signal determination flag information set to the second logic state.

8. The physical layer unit of claim 5, wherein the predetermined DSSS/CCK control is performed to allow for the DSSS/CCK preamble processing of the received signal within the second predetermined time period after the signal determination flag information is set to the second logic state within the first predetermined time period for OFDM preamble processing and detection of a converted digital signal corresponding to the OFDM standard.

9. The physical layer unit of claim 5, wherein the signal determination flag information is maintained in the first logic state if the converted digital signal subjected to the preamble processing corresponds to an OFDM standard, and is set to the second logic state if the converted digital signal subjected to the preamble processing does not correspond to the OFDM standard.

10. The physical layer unit of claim 8, wherein the second predetermined time period is 40 µs.

11. The physical layer unit of claim 10, wherein the first predetermined time period is 16 µs.

12. A wireless LAN system comprising:
an RF module that receives an OFDM modulation signal or a DSSS/CCK modulation signal as an analog signal and outputs an OFDM analog signal or a DSSS/CCK analog signal;
a physical layer unit that receives and converts an analog signal output from the RF module into a digital signal, interpolates and demodulates the digital signal, outputs the interpolated and demodulated signal as a DSSS/CCK demodulation signal, and directly demodulates and outputs the digital signal as an OFDM demodulation signal; wherein
an OFDM preamble processing of the received converted digital signal is performed within a first predetermined time period; and
a DSSS/CCK preamble processing of the received converted digital signal is performed within a second predetermined time period, and wherein when the converted digital signal, is interpolated and demodulated and the interpolated and demodulated signal is outputted as a DSSS/CCK demodulation signal when the DSSS/CCK preamble processing is performed before the ODFM preamble processing; and
the converted digital signal is directly demodulated without interpolation, and the demodulated signal is outputted as an OFDM demodulation signal when the OFDM preamble processing is performed before the DSSS/CCK preamble processing.

13. The wireless LAN system of claim 12, further comprising
a MAC layer which receives and processes information from other interfaced external layers according to a MAC protocol, outputs the packet signal, receives and link-distributes the DSSS/CCK demodulation signal or the OFDM demodulation signal, and outputs the link-distributed signal to the other interfaced external layers; and
wherein the physical layer unit comprises:
a Physical Layer Convergence Protocol (PLCP) processor that receives the packet signal and the demodulation signal, respectively, classifies the received signals according to an OFDM standard or a DSSS/CCK standard, relays the classified signals to respective corresponding upper layers using a PLCP, and performs general control operations;
a transmitting processor which receives the packet signal output from the PLCP processor, performs OFDM modulation or DSSS/CCK modulation of the packet signal, and outputs the modulated signal as an OFDM analog signal or a DSSS/CCK analog signal; and
a receiving processor which receives and converts the analog signal output from the RF module into the digital signal, interpolates and demodulates the converted digital signal, outputs the interpolated and demodulated signal as the DSSS/CCK demodulation signal to the PLCP processor, and directly demodulates and outputs the converted digital signal as the OFDM demodulation signal to the PLCP processor.

14. The LAN system of claim 13, wherein the transmitting processor comprises:
a DSSS/CCK modulator which receives and modulates the packet signal of the DSSS/CCK standard and outputs the modulated signal as the DSSS/CCK modulation signal;
an OFDM modulator which receives and modulates the packet signal of the OFDM standard and outputs the modulated signal as the OFDM modulation signal;
a MUX unit that outputs one of the DSSS/CCK modulation signal or the OFDM modulation signal according to a processing sequence; and
a D/A converter that converts a signal output from the MUX unit into an analog signal and outputs the converted analog signal as the OFDM analog signal or the DSSS/CCK analog signal.

15. The wireless LAN system of claim 12, wherein the physical layer unit comprises:
an Analog-to-Digital (A/D) converter that receives and converts an analog signal output from the RF module into a digital signal;
an interpolation unit that interpolates the digital signal;
a DSS/CCK demodulator which demodulates the interpolated signal and outputs the demodulated signal as the DSSS/CCK demodulation signal; and
an OFDM demodulator which directly demodulates the converted digital signal and outputs the demodulated signal as the OFDM demodulation signal.

16. The wireless LAN system of claim 12, wherein the interpolation is performed by synchronizing the converted digital signal to a sampling clock corresponding to a transmission rate of the DSSS/CCK standard and approximating the synchronized digital signal using a third-order or a higher-order function.

17. A wireless LAN system comprising:
an RF module that receives an OFDM modulation signal or a DSSS/CCK modulation signal as an analog signal and outputs an OFDM analog signal or a DSSS/CCK analog signal;
a physical layer unit that
receives and converts an analog signal output from the RF module into a digital signal,
performs OFDM preamble processing of the received converted digital signal within a first predetermined time period;
outputs the converted digital signal as an OFDM demodulation signal, according to a predetermined DSSS/CCK control, in response to signal determination flag information in a first logic state, the signal determination flag information being set by processing the converted digital signal when the OFDM preamble processing is successfully performed, and
performs a DSSS/CCK preamble processing of the received converted digital signal within a second predetermined time period when the OFDM preamble processing is not successfully performed;
interpolates, demodulates and outputs the converted digital signal as a DSSS/CCK demodulation signal, according to the predetermined DSSS/CCK control, in response to signal determination flag information in a second logic state when the DSSS/CCK preamble processing is successfully performed; and a MAC layer unit that link-distributes the DSSS/CCK demodulation signal or the OFDM demodulation signal to other interfaced external layers.

18. The wireless LAN system of claim 17, wherein the physical layer unit comprises: a receiving processor that receives an analog signal output from the RF module, converts the analog signal into a digital signal, and demodulates and outputs the digital signal as a DSSS/CCK demodulation signal, according to a predetermined DSSS/CCK control corresponding to signal determination flag information, and demodulates and outputs the converted digital signal as an OFDM demodulation signal in response to signal determination flag information with a first logic state created by processing the converted digital signal.

19. The wireless LAN system of claim 17 wherein the physical layer unit comprises:
a Physical Layer Convergence Protocol (PLCP) processor which receives the demodulation signal, classifies the received signal according to an OFDM standard or a DSSS/CCK standard, relays the classified signal to respective corresponding upper layers using a PLCP, and performs general control operations; and
a transmitting processor which receives a packet signal output from the PLCP processor, performs OFDM demodulation or DSSS/CCK modulation of the packet signal, and outputs the modulated signal as an OFDM analog signal or a DSSS/CCK analog signal; and
wherein the transmitting processor includes:
a DSSS/CCK modulator which receives and modulates the packet signal of the DSSS/CCK standard and outputs the modulated signal as a DSSS/CCK modulation signal;
an OFDM modulator which receives and modulates the packet signal of the OFDM standard and outputs the modulated signal as an OFDM modulation signal;
a MUX unit that outputs one of the DSSS/CCK modulation signal or the OFDM demodulation signal according to a processing sequence; and
a D/A converter that converts a signal output from the MUX unit into an analog signal and outputs the analog signal as an OFDM analog signal or an DSSS/CCK analog signal.

20. The wireless LAN system of claim 18, wherein the receiving processor comprises:
an A/D converter that receives an analog signal output from the RF module and converts it into a digital signal;
an OFDM demodulator which demodulates the converted digital signal, sets the signal determination flag information, and outputs the demodulated signal as the OFDM demodulation signal in response to the signal determination flag information in the first logic state;
a DSSS/CCK controller that performs the predetermined DSSS/CCK control corresponding to the state of the signal determination flag information;
a DSSS/CCK demodulator which demodulates and outputs a signal output from the DSSS/CCK controller as a DSSS/CCK demodulation signal.

21. The wireless LAN system of claim 17, wherein the signal determination flag information is maintained in a first logic state if the converted digital signal subjected to the OFDM preamble processing corresponds to an OFDM standard, and is set to a second logic state within the first predetermined time period if the converted digital signal subjected to the OFDM preamble processing does not correspond to the OFDM standard.

22. The wireless LAN system of claim 21, wherein the predetermined DSSS/CCK control is performed to allow the DSSS/CCK demodulator to perform the DSSS/CCK preamble processing of the received signal within the second predetermined time period after the signal determination flag information is set to the second logic state.

23. The wireless LAN system of claim 22, wherein the second predetermined time period is 40 µs.

24. The wireless LAN system of claim 22, wherein the first predetermined time period is 16 µs.

25. A wireless LAN method, which is implemented on a wireless LAN system, comprising:
receiving a radio wave and extracting and outputting an OFDM analog signal or a DSSS/CCK analog signal;
converting the analog signal into a digital signal;
performing OFDM preamble processing of the received converted digital signal within a first predetermined time period;
performing DSSS/CCK preamble processing of the received converted digital signal within a second predetermined time period;
interpolating the converted digital signal when the DSSS/CCK preamble processing is performed before the ODFM preamble processing;
demodulating the interpolated signal as a DSSS/CCK demodulation signal when the DSSS/CCK preamble processing is performed before the ODFM preamble processing;
directly demodulating and outputting the converted digital signal as an OFDM demodulation signal when the OFDM preamble processing is performed before the DSSS/CCK preamble processing; and
link-distributing one of the DSSS/CCK demodulation signal and the OFDM demodulation signal to other interfaced external layers.

26. The wireless LAN method of claim 25, wherein the interpolation is performed by synchronizing the converted digital signal to a sampling clock corresponding to a transmission rate of the DSSS/CCK standard and approximating the synchronized digital signal using a third-order or a higher-order function.

27. A wireless LAN method, which is implemented on a wireless LAN system, comprising:
receiving a radio wave, and extracting and outputting an OFDM analog signal and a DSSS/CCK analog signal;
converting the analog signal into a digital signal;
performing OFDM preamble processing of the received converted digital signal within a first predetermined time period;
processing the converted digital signal and setting the state of signal determination flag information;
outputting the converted digital signal as an OFDM demodulation signal in response to signal determination flag information in a first logic state when the OFDM preamble processing is successfully performed;
performing a predetermined DSSS/CCK control corresponding to the signal determination flag information;
performing a DSSS/CCK preamble processing of the received converted digital signal within a second predetermined time period when the OFDM preamble processing is not successfully performed;
interpolating, demodulating and outputting the converted digital signal as an DSSS/CCK demodulation signal, according to the predetermined DSSS/CCK control, in response to signal determination flag information in a second logic state when the DSSS/CCK preamble processing is successfully performed; and link-distributing the DSSS/CCK demodulation signal or the OFDM demodulation signal to other interfaced external layers.

28. The wireless LAN method of claim 27, wherein the signal determination flag information is maintained in the first logic state if the converted digital signal subjected the OFDM preamble processing corresponds to an OFDM standard, and the signal determination flag information is set to the second logic state, if the converted digital signal subjected to the OFDM preamble processing does not correspond to the OFDM standard.

29. The wireless LAN method of claim 28, wherein the predetermined control is performed to allow the DSSS/CCK demodulator to perform the DSSS/CCK preamble processing of the received signal within the second predetermined time period after the signal determination flag information is set to the second logic state.

30. The wireless LAN method of claim 29, wherein the second predetermined time period is 40 µs.

31. The wireless LAN method of claim 29, wherein the first predetermined time period is 16 µs.

\* \* \* \* \*